US012362773B2

(12) United States Patent
Yang et al.

(10) Patent No.: US 12,362,773 B2
(45) Date of Patent: Jul. 15, 2025

(54) INTEGRATED PROGRAMMABLE GAIN AMPLIFIER (PGA) AND PROTECTION CIRCUIT

(71) Applicant: Avago Technologies International Sales Pte. Limited, Singapore (SG)

(72) Inventors: Xiaochen Yang, Irvine, CA (US); Hamid Hatamkhani, Aliso Viejo, CA (US); Guansheng Li, Irvine, CA (US); Yong Liu, Irvine, CA (US); Delong Cui, Tustin, CA (US); Jun Cao, Irvine, CA (US)

(73) Assignee: Avago Technologies International Sales Pte. Limited, Palo Alto, CA (US)

( * ) Notice: Subject to any disclaimer, the term of this patent is extended or adjusted under 35 U.S.C. 154(b) by 484 days.

(21) Appl. No.: 17/733,219

(22) Filed: Apr. 29, 2022

(65) Prior Publication Data
US 2023/0353173 A1 Nov. 2, 2023

(51) Int. Cl.
H04B 1/04 (2006.01)
H04B 1/00 (2006.01)

(52) U.S. Cl.
CPC .............. H04B 1/04 (2013.01); H04B 1/0003 (2013.01); H04B 2001/0416 (2013.01); H04B 2001/0425 (2013.01)

(58) Field of Classification Search
CPC ......... H03F 2200/294; H03F 2200/451; H03F 3/45475; H03F 2203/45528; H03F 3/195; H03F 1/30; H03F 3/19; H03F 2203/45116; H03F 1/0233; H03F 2200/165; H03F 2200/471; H03F 2200/78; H03F 2203/45288; H03F 3/45071; H03F 2203/45536; H03F 3/005; H03F 1/523; H03G 3/3068; H03G 3/001; H03G 3/30; H03G 3/3078; H03G 1/0088; H03G 3/3052; H03G 3/3036; H03G 1/0094; H03G 3/008; H03G 3/3005; H03G 3/3026; H03G 3/3089; H03G 1/0029; H03G 2201/103;
(Continued)

(56) References Cited
U.S. PATENT DOCUMENTS 9,407,276 B1 * 8/2016 Coban ................. H03M 1/1009
2011/0076977 A1 * 3/2011 Coban ................. H03G 3/3068
455/234.1

(Continued)

Primary Examiner — Golam Sorowar
(74) Attorney, Agent, or Firm — Quarles & Brady LLP

(57) ABSTRACT

Novel tools and techniques are provided for implementing a novel integrated programmable gain amplifier ("PGA") and protection circuit. In various embodiments, a circuit is provided that comprises: a PGA, an analog-to-digital converter ("ADC"), and a protection circuit all disposed on the same semiconductor chip. The PGA is configured to receive as input a wireless signal received from an antenna and to output, at its output, an amplified wireless signal based on the wireless signal being amplified by a programmable gain amount. The protection circuit is configured to, in response to detecting a spike in gain at the output of the PGA that exceeds a threshold amplitude, control a decrease in the programmable gain amount to cause a resultant signal at the output of the PGA to be below the threshold amplitude. A normally-open switch may also be added at differential outputs of the PGA to further clamp PGA output.

16 Claims, 6 Drawing Sheets

(58) Field of Classification Search
CPC ........ H03G 3/3031; H03G 3/00; H03G 3/002;
H03G 3/20; H03G 5/025; H04B 1/16;
H04B 17/318; H04B 1/30; H04B 1/123;
H04B 1/0007; H04B 1/006; H04B
1/1027; H04B 1/109; H04B 1/406; H04B
17/345
See application file for complete search history.

(56) References Cited

U.S. PATENT DOCUMENTS

2013/0342274 A1\* 12/2013 Coban ..................... H03F 1/223
330/252
2018/0062595 A1\* 3/2018 Osawa ................. H03G 1/0094

\* cited by examiner

INTEGRATED PROGRAMMABLE GAIN AMPLIFIER (PGA) AND PROTECTION CIRCUIT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing wireless receiver applications, and, more particularly, to methods, systems, and apparatuses for implementing a novel integrated programmable gain amplifier ("PGA") and protection circuit, in some cases, for wireless base station applications.

BACKGROUND

A conventional direct sampling receiver for a wireless base station is required to have an off-chip gain programmable component, which results in significant fabrication costs as well as large power consumption. It is desirable to have an integrated approach which includes a programmable gain amplifier ("PGA") on the same semiconductor chip as a direct sampling high-speed analog-to-digital converter ("ADC").

However, one technical difficulty of integrating a PGA with a high speed ADC is the reliability issue with such advanced complementary metal-oxide semiconductor ("CMOS") technology. Advanced CMOS technology can be less reliable, especially under high supply operation usually needed for high linear wireless application. The wireless base station receiver design is required to ensure reliability and to withstand large input swings (e.g., 10's of dBm, etc.). A sudden jump on the received input power will damage the front-end CMOS circuit without a quick protection circuit. Off-chip gain programmable components limit the whole response time as the peak detection usually involves slow digital logic, and then needs to travel through the slow off-chip connection to the off-chip gain component for gain adjustment.

A high supply voltage is usually needed to meet the extremely stringent linearity requirement for a wireless base station receiver, which in turn causes more stress on the CMOS transistor reliability. Under this high supply, intrinsic reliability of a receiver front-end circuit without any active protection circuit is also required for improvement.

Hence, there is a need for more robust and scalable solutions for implementing wireless receiver applications, and, more particularly, to methods, systems, and apparatuses for implementing a novel integrated PGA and protection circuit.

SUMMARY

The techniques of this disclosure generally relate to tools and techniques for implementing wireless receiver applications, and, more particularly, to methods, systems, and apparatuses for implementing a novel integrated PGA and protection circuit.

In an aspect, a circuit comprises: a programmable gain amplifier ("PGA") disposed on a semiconductor chip, the PGA configured to receive as input a wireless signal received directly or indirectly from an antenna and to output, at an output of the PGA, an amplified wireless signal based on the wireless signal being amplified by a programmable gain amount; an analog-to-digital converter ("ADC") disposed on the semiconductor chip, the ADC configured to convert the amplified wireless signal that is received directly or indirectly from the PGA to a digital signal; and a protection circuit disposed on the semiconductor chip, the protection circuit configured to, in response to detecting a spike in gain at the output of the PGA that exceeds a first threshold amplitude, control a decrease in the programmable gain amount to cause a resultant signal at the output of the PGA to be below the first threshold amplitude.

According to some embodiments, the protection circuit comprises a detector and a gain control ("GC") circuit. In some cases, the detector is configured to send a first signal activating the GC circuit in response to detecting a spike in gain at the output of the PGA that exceeds the first threshold amplitude, and to reset to a state of monitoring the output of the PGA that occurred prior to activation of the GC circuit in response to receiving a second signal from the GC circuit. In some instances, the GC circuit is configured to control the decrease in the programmable gain amount in response to receiving the first signal, and to send the second signal to the detector after a predetermined period following at least one of receiving the first signal or controlling the decrease in the programmable gain amount. Merely by way of example, in some cases, controlling a decrease in the programmable gain amount comprises controlling the programmable gain amount to a minimum gain state.

Alternatively, or additionally, the circuit further comprises a normally-open ("NO") switch disposed on the semiconductor chip, the NO switch bridging the output of the PGA and one of ground or a second output of the PGA, the NO switch configured to close circuit in response to the amplified wireless signal exceeding a second threshold amplitude, thereby clamping or limiting the output of the PGA. In some instances, the NO switch comprises at least one of a clamp switch, a load switch, or a combination control logic and transistor switch, and/or the like. In some cases, the second threshold amplitude is the same as the first threshold amplitude.

According to some embodiments, the semiconductor chip comprises a complementary metal-oxide semiconductor ("CMOS") chip.

In some embodiments, the circuit further comprises a filter that is disposed between the PGA and the ADC. In some instances, the filter comprises at least one of a resistor-inductor-capacitor ("RLC") filter, a high-pass filter, a band-pass filter, or a low-pass filter, and/or the like.

In another aspect, an apparatus comprises an antenna and a circuit. According to some embodiments, the circuit comprises: a complementary metal-oxide semiconductor ("CMOS") chip; a programmable gain amplifier ("PGA") disposed on the CMOS chip, the PGA configured to amplify, based on a programmable gain amount, a wireless signal received directly or indirectly from an antenna and to output, at an output of the PGA, the amplified wireless signal; an analog-to-digital converter ("ADC") disposed on the CMOS chip, the ADC configured to convert the amplified wireless signal that is received directly or indirectly from the PGA to a digital signal; and a protection circuit disposed on the CMOS chip in an integrated manner with at least one of the PGA and the ADC, the protection circuit configured to prevent amplified wireless signals that exceed a first threshold amplitude from being input at the ADC.

In some embodiments, the protection circuit comprises a detector and a gain control ("GC") circuit. In some cases, the detector is configured to send a first signal activating the GC circuit in response to detecting a spike in gain at the output of the PGA that exceeds the first threshold amplitude, and to reset to a state of monitoring the output of the PGA that occurred prior to activation of the GC circuit in response to receiving a second signal from the GC circuit. In some instances, the GC circuit is configured to control a decrease in the programmable gain amount to cause a resultant signal at the output of the PGA to be below the first threshold amplitude, in response to receiving the first signal, and to send the second signal to the detector after a predetermined period following at least one of receiving the first signal or controlling the decrease in the programmable gain amount. In some cases, controlling a decrease in the programmable gain amount comprises controlling the programmable gain amount to a minimum gain state.

Alternatively, or additionally, the protection circuit comprises a normally-open ("NO") switch disposed on the CMOS chip, the NO switch bridging the output of the PGA and one of ground or a second output of the PGA, the NO switch configured to close circuit in response to the amplified wireless signal exceeding a second threshold amplitude, thereby clamping or limiting the output of the PGA. In some instances, the NO switch comprises at least one of a clamp switch, a load switch, or a combination control logic and transistor switch, and/or the like.

According to some embodiments, the circuit further comprises a filter that is disposed between the PGA and the ADC, the filter comprising at least one of a resistor-inductor-capacitor ("RLC") filter, a high-pass filter, a bandpass filter, or a low-pass filter, and/or the like.

In yet another aspect, a method comprises: amplifying, using a programmable gain amplifier ("PGA") disposed on a semiconductor chip and based on a programmable gain amount, a wireless signal received directly or indirectly from an antenna; outputting, using the PGA and at an output of the PGA, the amplified wireless signal; in response to the amplified wireless signal exceeding a first threshold amplitude ("excessively amplified wireless signal"), preventing, using a protection circuit disposed on the semiconductor chip, the excessively amplified wireless signal from being relayed to an analog-to-digital converter ("ADC") disposed on the semiconductor chip; and allowing, using the protection circuit, the amplified wireless signal to be relayed to the ADC for converting the amplified wireless signal to a digital signal, when the amplified wireless signal does not exceed the first threshold amplitude.

In some embodiments, the protection circuit comprises a detector and a gain control ("GC") circuit. In some cases, preventing the excessively amplified wireless signal from being relayed to the ADC comprises sending, using the detector, a first signal activating the GC circuit in response to detecting a spike in gain at the output of the PGA that exceeds the first threshold amplitude; and, in response to receiving the first signal, controlling, using the GC circuit, a decrease in the programmable gain amount to cause a resultant signal at the output of the PGA to be below the first threshold amplitude. According to some embodiments, the method further comprises: after a predetermined period following at least one of receiving the first signal or controlling the decrease in the programmable gain amount, sending, using the GC circuit, a second signal to the detector; and resetting, using the detector, to a state of monitoring the output of the PGA that occurred prior to activation of the GC circuit, in response to receiving the second signal from the GC circuit.

Alternatively, or additionally, wherein the protection circuit comprises a normally-open ("NO") switch disposed on the semiconductor chip that bridges the output of the PGA and one of ground or a second output of the PGA. In some instances, preventing the excessively amplified wireless signal from being relayed to the ADC comprises causing, using the NO switch, a closed circuit in response to the amplified wireless signal exceeding the first threshold amplitude, thereby clamping or limiting the output of the PGA.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Overview

Figure 1:
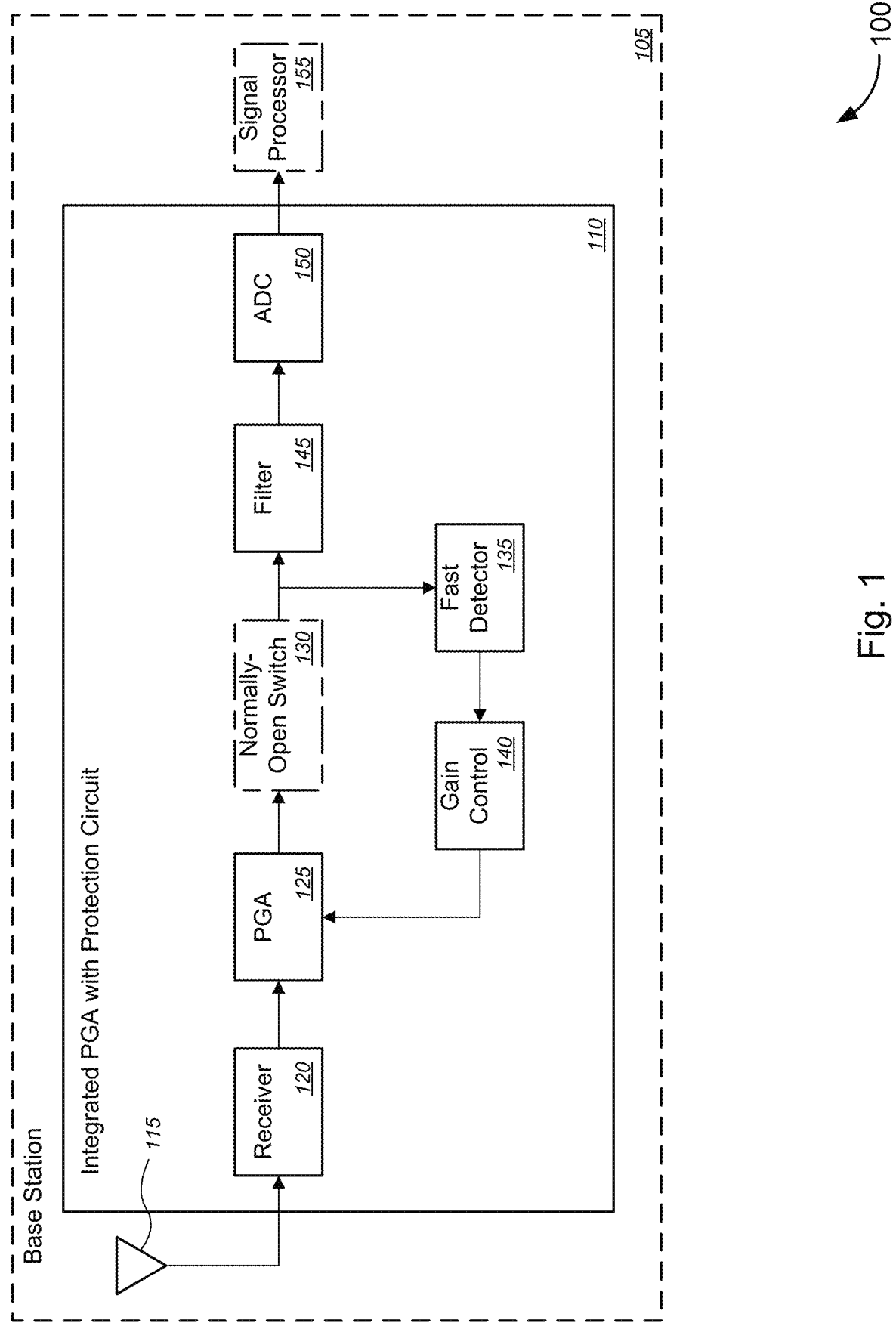
FIG. 1 is a schematic diagram illustrating a system comprising a novel integrated programmable gain amplifier ("PGA") and protection circuit, in accordance with various embodiments.

Various embodiments provide tools and techniques for implementing wireless receiver applications, and, more particularly, to methods, systems, and apparatuses for implementing a novel integrated programmable gain amplifier ("PGA") and protection circuit.

In various embodiments, a circuit (e.g., a receiver circuit, or the like) is provided that comprises: a programmable gain amplifier ("PGA") disposed on a semiconductor chip, the PGA configured to receive as input a wireless signal received directly or indirectly from an antenna and to output, at an output of the PGA, an amplified wireless signal based on the wireless signal being amplified by a programmable gain amount; an analog-to-digital converter ("ADC") disposed on the semiconductor chip, the ADC configured to convert the amplified wireless signal that is received directly or indirectly from the PGA to a digital signal; and a protection circuit disposed on the semiconductor chip, the protection circuit configured to, in response to detecting a spike in gain at the output of the PGA that exceeds a first threshold amplitude, control a decrease in the programmable gain amount to cause a resultant signal at the output of the PGA to be below the first threshold amplitude.

According to some embodiments, the protection circuit comprises a detector and a gain control ("GC") circuit. In some cases, the detector is configured to send a first signal (also referred to as an "activation signal" or the like) activating the GC circuit in response to detecting a spike in gain at the output of the PGA that exceeds the first threshold amplitude, and to reset to a state of monitoring the output of the PGA that occurred prior to activation of the GC circuit (also referred to as an "initial monitoring state" or the like) in response to receiving a second signal (also referred to as a "release signal" or the like) from the GC circuit. In some instances, the GC circuit is configured to control the decrease in the programmable gain amount in response to receiving the first signal, and to send the second signal to the detector after a predetermined period following at least one of receiving the first signal or controlling the decrease in the programmable gain amount. Merely by way of example, in some cases, controlling a decrease in the programmable gain amount comprises controlling the programmable gain amount to a minimum gain state.

Alternatively, or additionally, the circuit further comprises a normally-open ("NO") switch disposed on the semiconductor chip, the NO switch bridging the output of the PGA and one of ground or a second output of the PGA, the NO switch configured to close circuit in response to the amplified wireless signal exceeding a second threshold amplitude, thereby clamping or limiting the output of the PGA. In some instances, the NO switch comprises at least one of a clamp switch, a load switch, or a combination control logic and transistor switch, and/or the like. In some cases, the second threshold amplitude is the same as the first threshold amplitude.

According to some embodiments, the semiconductor chip comprises a complementary metal-oxide semiconductor ("CMOS") chip.

In the various aspects described herein, a novel integrated programmable gain amplifier ("PGA") and protection circuit is provided. This allows for several advantages at the circuit, system, and product levels. For example, some circuit advantages include, but are not limited to, low power and low cost, with an integrated CMOS PGA saving significant power and with greater cost reduction compared with conventional off-chip PGAs; and the PGA protection circuit will ensure the reliability of the entire receiver path without negatively affecting the receiver performance; high speed and high performance; and/or the like. Some system advantages include, without limitation, eliminating off-chip PGAs, thus allowing for a more compact overall system, thereby providing significant power and cost advantages; and because the reliability of the receiver front-end is protected, greater flexibility can be achieved for the operation of other off-chip components of a wireless base station receiver; and/or the like. Some product advantages include, but are not limited to, significant power reduction; integration advantages; fabrication advantages; and/or the like.

These and other aspects of the system and method for implementing a novel integrated PGA and protection circuit are described in greater detail with respect to the figures. Although some embodiments are described in terms of implementation of the integrated PGA and protection circuit within a wireless base station application, the various embodiments are not so limited, and the integrated PGA and protection circuit (as described herein) may be applicable to any wireless application in general, in which analog signal detection is used.

The following detailed description illustrates a few embodiments in further detail to enable one of skill in the art to practice such embodiments. The described examples are provided for illustrative purposes and are not intended to limit the scope of the invention.

In the following description, for the purposes of explanation, numerous details are set forth in order to provide a thorough understanding of the described embodiments. It will be apparent to one skilled in the art, however, that other embodiments of the present invention may be practiced without some of these details. In other instances, some structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Some Embodiments

We now turn to the embodiments as illustrated by the drawings. FIGS. 1-5 illustrate some of the features of the method, system, and apparatus for implementing wireless receiver applications, and, more particularly, to methods, systems, and apparatuses for implementing a novel integrated programmable gain amplifier ("PGA") and protection circuit, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 comprising a novel integrated PGA and protection circuit, in accordance with various embodiments.

In the non-limiting embodiment of FIG. 1, system 100 comprises a (wireless) apparatus 105 (such as, but not limited to, a wireless base station, transceiver, etc.), which includes, without limitation, a semiconductor chip 110, an antenna 115, and a signal processor(s) 155. In some embodiments, the semiconductor chip 110 is a chip with an integrated PGA and protection circuit, and includes, but is not limited to, a receiver 120, a PGA 125, a normally-open switch 130 (optional), a fast detector 135 (which includes, without limitation, at least one of a detector circuit, a detector chip, a sensor circuit, a sensor chip, or the like, each configured to detect sudden jumps or spikes in input signal over a short period (e.g., with ns, µs, or ms, etc.) and/or instantaneous, or the like), a gain control ("GC") circuit 140, a filter 145, and an analog-to-digital converter ("ADC") 150, or the like. In some cases, the semiconductor chip 110 is a complementary metal-oxide semiconductor ("CMOS") chip, or the like. Herein, "PGA" may refer to a gain amplifier circuit that is configurable or programmable using a gain control signal from a gain control circuit, or the like, while "integrated PGA" may refer to a PGA that is integrated on the same semiconductor chip as an ADC or other signal processing circuit(s), or the like. Herein, the PGA or integrated PGA, the ADC, the protection circuit, the switches, and/or other circuit components may be described as being "disposed" on the semiconductor chip 110, which includes at least one of being mounted on the semiconductor chip 110, plugged into or connected to mounting ports that are mounted on the semiconductor chip 110, or otherwise placed in a permanently fixed or removably fixed manner on the semiconductor chip 110, or the like, while the input(s) and output(s) of these circuit components are communicatively coupled or connected to other appropriate circuit components or contacts via corresponding conductive traces on the semiconductor chip 110.

The receiver 120 is configured to receive a wireless signal from antenna 115, while the PGA 125 is configured to receive as input a wireless signal received directly from antenna 155 or indirectly via receiver 120 (and/or other intervening circuit components, or the like), and to output, at its output, an amplified wireless signal based on the wireless signal being amplified by a programmable gain amount.

To protect the ADC 150 from receiving a signal that can damage or destroy it, a protection circuit is used that is integrated on the semiconductor chip 110 with at least one of the PGA 125 and ADC 150. In some embodiments, the protection circuit comprises fast detector 135 and GC circuit 140. In response to detecting a spike in gain at the output of the PGA 125 that exceeds a first threshold amplitude, the detector sends a first signal (also referred to as an "activation signal" or the like) activating the GC circuit. In response to receiving the first (or activation) signal, the GC circuit 140 controls a decrease in the programmable gain amount, by sending a gain control signal, to cause a resultant signal at the output of the PGA to be below the first threshold amplitude (e.g., 100's of millivolts, or the like). After a predetermined period (e.g., between a few nanoseconds and a few milliseconds, or longer) following at least one of receiving the first signal or controlling the decrease in the programmable gain amount, the GC circuit 140 sends a second signal (also referred to as a "release signal" or the like) to the fast detector 135. In response to receiving the second (or release) signal from the GC circuit 140, the fast detector 135 resets itself and PGA 125 (i.e., the programmable gain amount) to an initial or previous state.

Figure 3:
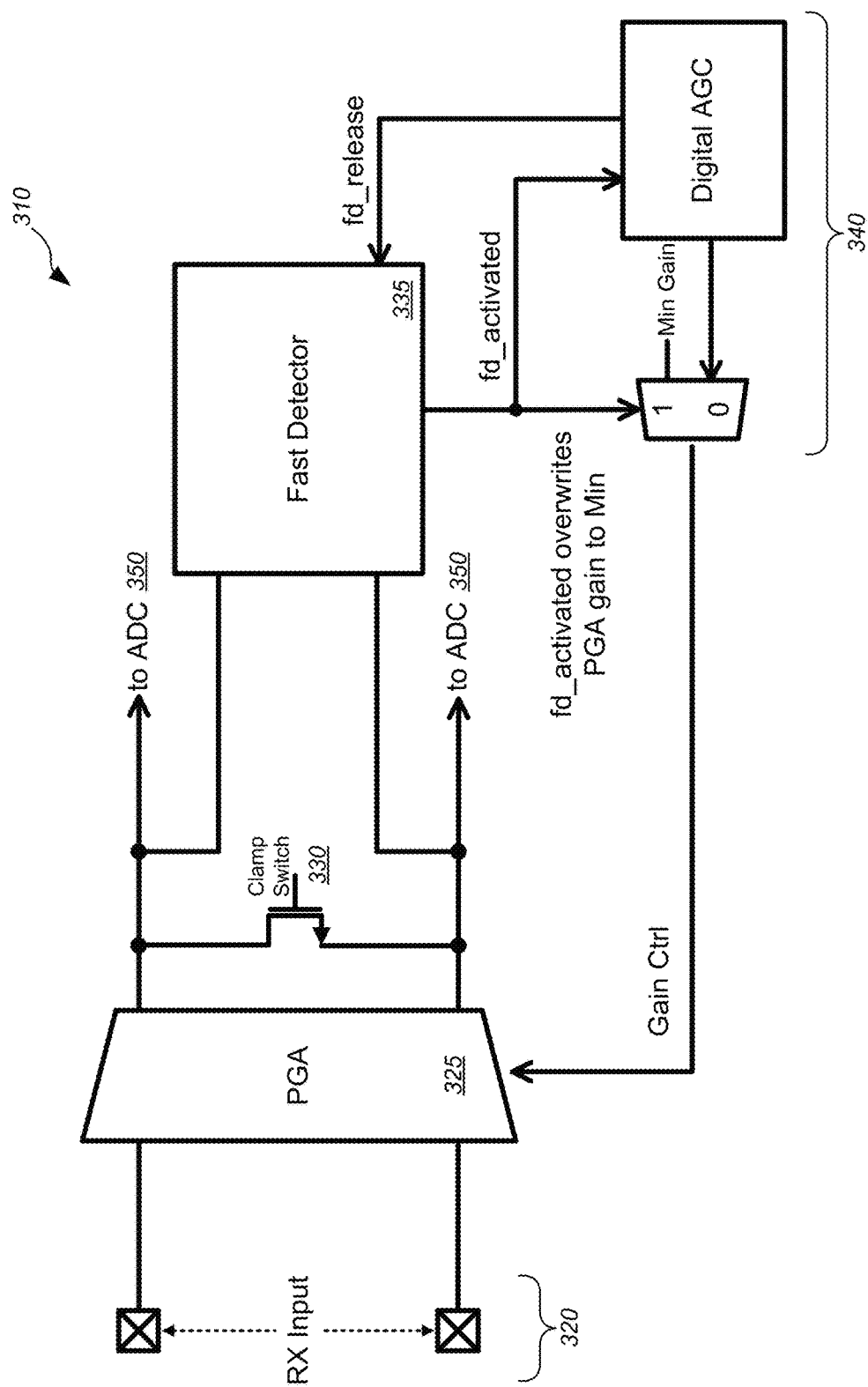
FIG. 3 is a schematic diagram illustrating an alternative non-limiting example of the novel integrated PGA and protection circuit, in accordance with various embodiments.

Alternatively, or additionally, the protection circuit comprises, or further comprises, normally-open ("NO") switch 130 that bridges the output of the PGA and one of ground or a second output of the PGA. In some instances, the NO switch 130 includes, without limitation, at least one of a clamp switch (as shown in FIG. 3, or the like), a load switch (not shown), or a combination control logic and transistor switch (not shown), and/or the like. Herein, the NO switch bridging the output of the PGA may include one or more intervening circuit components or no intervening circuit components between at least one end of the NO switch and a corresponding output terminal of the PGA. Herein, a "clamp switch" may refer to a circuit configured to limit or "clamp" an output voltage (in this case, output of the PGA) to a specified or predetermined range of output values (in this case, to a value below the first threshold amplitude, or the like). Herein, a "load switch" may refer to a circuit configured to provide overcurrent protection (i.e., to control sudden current (or voltage) spikes in a fixed or adjustable manner), and in some cases may do so using fixed or adjustable rise time, which controls sudden flows of current (sometimes referred to as "inrush current" or the like) and/or slew rate of the device (e.g., the PGA, or the like). In response to the amplified wireless signal at the output of the PGA 125 exceeding a second threshold amplitude, the NO switch is caused to close circuit (or turn on), thereby clamping or limiting the output of the PGA to a predetermined level. When the amplified wireless signal at the output of the PGA 125 drops below the second threshold amplitude, the NO switch is caused to open circuit again (or turn off), thereby resetting to its initial state. In some cases, the second threshold amplitude is the same as the first threshold amplitude. Alternatively, the second threshold amplitude is greater than the first threshold amplitude, in which case, the NO switch 130 serves as a back-up protection circuit to the combination of the fast detector 135 and GC circuit 140 (if said combination is present).

When the amplified wireless signal that is output at the PGA 125 is below the first threshold amplitude, the amplified wireless signal is relayed to (or otherwise allowed to proceed toward) ADC 150, in some cases, via filter 145. In some cases, filter 145 includes, but is not limited to, at least one of a resistor-inductor-capacitor ("RLC") filter, a high-pass filter, a bandpass filter, or a low-pass filter, and/or the like. ADC 150 then converts the amplified wireless signal from an analog signal to a digital signal, which is then processed by a signal processor (such as signal processor 155), as part of other operations of the apparatus 105 as known in the art.

These and other functions of the system 100 (and its components) are described in greater detail below with respect to FIGS. 2-5.

Figure 2:
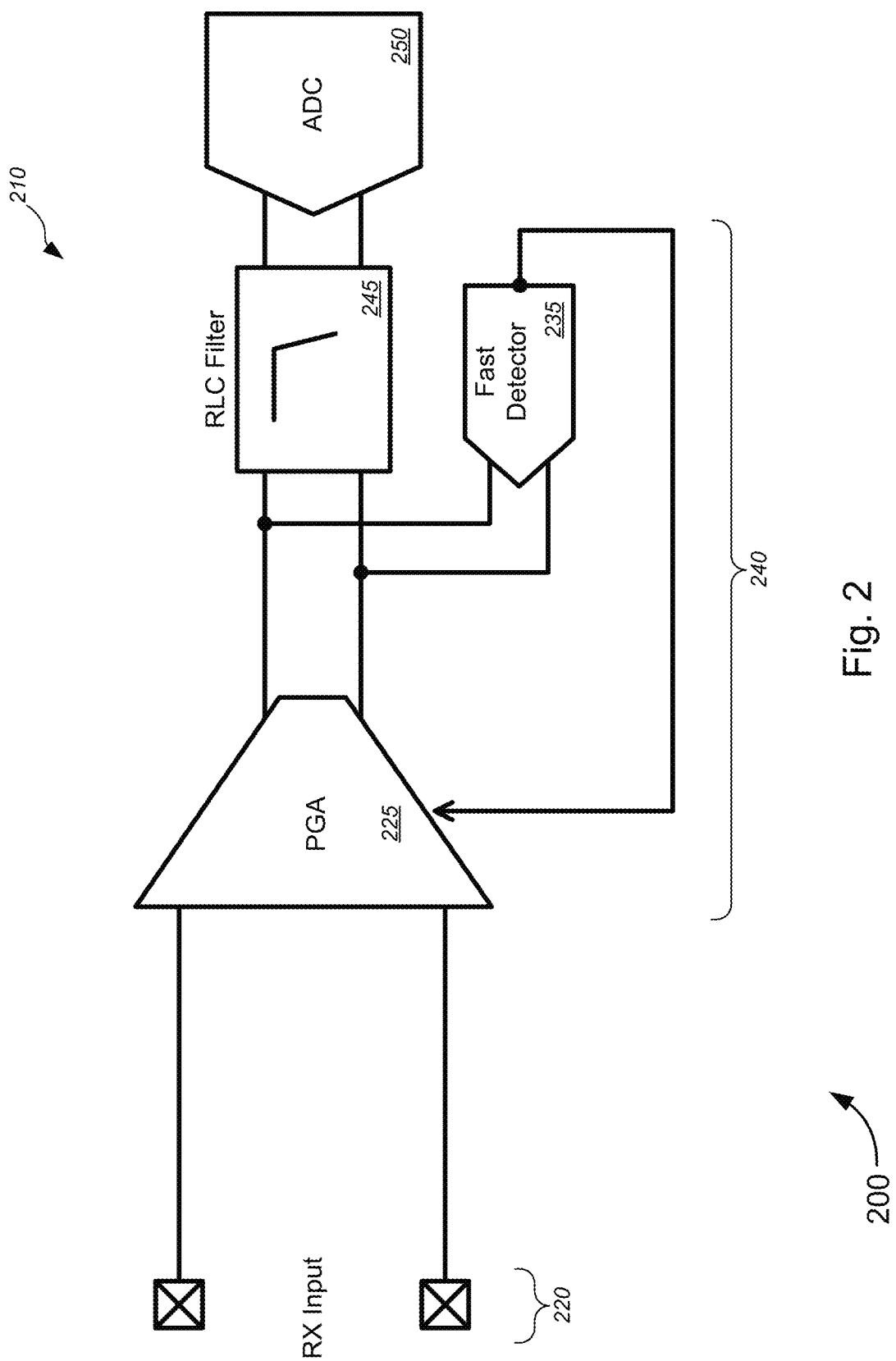
FIG. 2 is schematic diagram illustrating a non-limiting example of a novel integrated PGA and protection circuit, in accordance with various embodiments.

FIG. 2 is schematic diagram illustrating a non-limiting example 200 of a novel integrated PGA and protection circuit, in accordance with various embodiments.

In the non-limiting example 200 of FIG. 2, a CMOS chip 210 with integrated PGA and reliability protection for a direct sampling base station receiver is shown. As depicted in FIG. 2, a CMOS PGA 225 is integrated with a high-speed direct sampling ADC 250 on the same advanced CMOS chip 210. Such integration of the PGA 225 and the ADC 250 on the same CMOS chip 210 presents significant integration advantages in terms of cost and power. In some cases, the PGA uses an input programmable resistor array (not shown, which, in some cases, is part of GC circuit 240) for gain programmability. A RLC anti-aliasing filter 245 is also used to remove any out-of-band noise before Nyquist sampling at the ADC 250.

A fast detector 235 is placed at the PGA output for reliability protection. Any large input power jump (such as exceeding the first threshold amplitude, as described above with respect to FIG. 1, or the like) can be instantly detected (i.e., less than 100 ns, in some cases, less than 5 ns, and, in other cases, less than 0.5 ns, or the like; effectively in real-time or near-real-time) by fast detector 235. Fast detector 235, in turn, maximizes input attenuation to protect the receiver from the large input jump, by controlling GC circuit 240, or by sending a first signal activating the GC circuit 240, to cause a decrease in the programmable gain amount of the PGA to cause a resultant signal at the output of the PGA to be below the first threshold amplitude. This short analog feedback loop offers much faster response time (on the order of nanoseconds, such as described below with respect to FIG. 4, or the like) compared with conventional digital detection and feedback.

In some embodiments, CMOS 210, receiver 220, PGA 225, fast detector 235, GC circuit 240, RLC filter 245, and ADC 250 of FIG. 2 are otherwise similar, if not identical, to semiconductor chip 110, receiver 120, PGA 125, fast detector 135, GC circuit 140, filter 145, and ADC 150, respectively, of FIG. 1, and the descriptions of these components in FIG. 1 are similarly applicable to the corresponding components in FIG. 2.

These and other functions of the example 200 (and its components) are described in greater detail herein with respect to FIGS. 1 and 3-5.

FIG. 3 is a schematic diagram illustrating an alternative non-limiting example 300 of the novel integrated PGA and protection circuit, in accordance with various embodiments.

Figure 4:
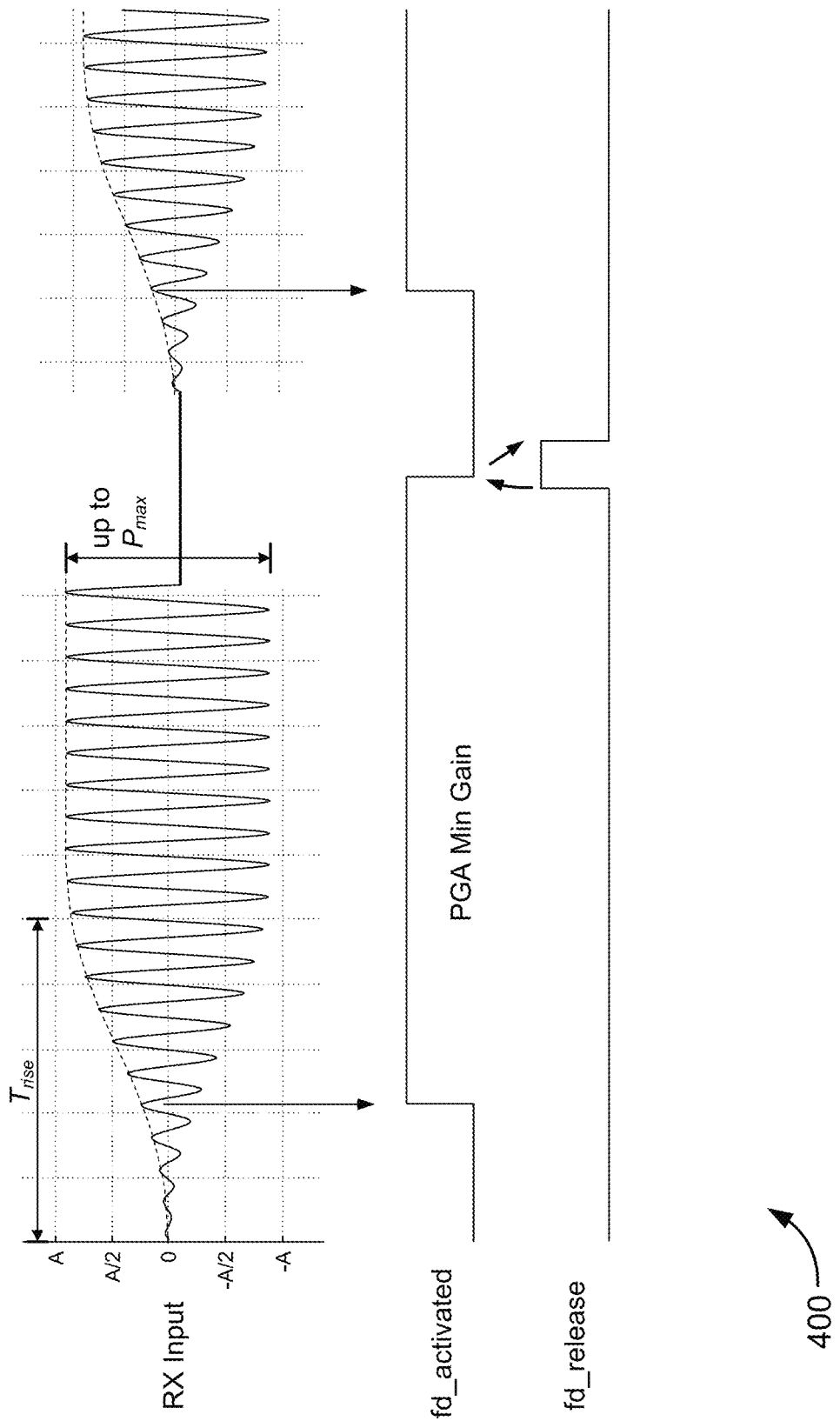
FIG. 4 is a graphical diagram illustrating a non-limiting example of operation of the novel integrated PGA and protection circuit (e.g., of FIG. 3, or the like), in response to the amplified wireless signal at the output of the PGA exceeding a threshold amplitude, in accordance with various embodiments.

As depict in the non-limiting example 300 of FIG. 3, a fast detector 335 is located at the output of PGA 325 to detect the output swing of the PGA 325. Upon detecting a damaging swing (e.g., a signal swing exceeding the first threshold amplitude, or the like, as described above with respect to FIG. 1), a first signal (also referred to as an "activation signal; in this case, "fd_activated" or the like) will be set high (as shown in FIG. 4, or the like), which will immediately overwrite a gain code of digital automatic gain control ("AGC") circuit 340, which, in turn, will place the PGA 325 in a minimum gain position or state so that an internal swing of the PGA 325 is kept at a minimum for reliability protection. Herein, "minimum gain state" or "minimum gain position" may refer to a state of gain that is either the lowest gain setting for the PGA or a gain setting within a range between the lowest gain setting and a predetermined "low" gain setting that is equal to one of about 1%, 5%, or 10% of the maximum gain setting, or the like. After a predetermined period (e.g., between a few nanoseconds and a few milliseconds, or longer) following at least one of receiving the first (or activation) signal (i.e., "fd_activated" in FIG. 3) or controlling the decrease in the programmable gain amount (i.e., "Gain Ctrl" in FIG. 3), digital AGC circuit 340 sends a second signal (also referred to as a "release signal"; in this case, "fd_release" or the like) to the fast detector 335. In response to receiving the second (or release) signal from the GC circuit 340, the fast detector 335 resets itself and PGA 325 (i.e., the programmable gain amount) to an initial or previous state.

To further enhance the reliability of PGA 325, and to limit the output swing of PGA 325, a normally-open ("NO") switch 330 (also referred to as a "normally-off switch" or the like; in this case, a clamp switch 330, or the like) is disposed differentially at the output of the PGA 325. If the PGA output swing becomes very high (e.g., exceeding the first threshold amplitude, or the like), the NO switch 330 will automatically turn itself on (or closed) to limit the output swing. The differential NO switch 330 (or claim switch in this case) does not need to be a large sized switch; in this way, its impact on the receiver's performance can be minimized (compared with a large sized switch that will have great impact on receiver performance). Even without the protection circuit, the differential NO switch 330 enhances the intrinsic receiver reliability, resulting in longer lifetime under the same stress of large input power.

In some embodiments, semiconductor 310, receiver 320, PGA 325, fast detector 335, digital AGC circuit 340, and ADC 350 of FIG. 3 are otherwise similar, if not identical, to semiconductor chip 110, receiver 120, PGA 125, fast detector 135, GC circuit 140, and ADC 150, respectively, of FIG. 1, and the descriptions of these components in FIG. 1 are similarly applicable to the corresponding components in FIG. 3.

These and other functions of the example 300 (and its components) are described in greater detail herein with respect to FIGS. 1, 2, 4, and 5.

FIG. 4 is a graphical diagram illustrating a non-limiting example 400 of operation of the novel integrated PGA and protection circuit (e.g., of FIG. 3, or the like) in response to the amplified wireless signal at the output of the PGA exceeding a threshold amplitude, in accordance with various embodiments.

For wireless apparatus applications (e.g., wireless base station applications, wireless transceiver applications, etc.), the receiver is required to withstand a large input jump as much as 10's of dBm (denoted in FIG. 4 by the notation, "up to $P_{max}$" or the like) in 10's ns (or less) (denoted in FIG. 4 by the notation, "$T_{rise}$" or the like). Reliability protection in such a short time is difficult to achieve in off-chip components. With the integrated PGA and protection circuit of FIGS. 1-3, or the like, fast analog signal protection can be achieved.

In the fast detector timing diagram as depicted in the non-limiting example 400 of FIG. 4, the fast detector (e.g., fast detector 135, 235, or 335 of FIGS. 1-3, or the like) monitors the PGA output swing (which can include 10's of millivolts to 100's of millivolts, or greater, especially if no protection circuit is used). As soon as the swing reaches a certain threshold (e.g., the first threshold amplitude, as described above with respect to FIG. 1, or the like), a first signal (or an activation signal; in this case, "fd_activated" or the like) will be triggered high and immediately overwrites the PGA (e.g., PGA 125, 225, or 325 of FIGS. 1-3, or the like) to minimum gain (as depicted in the digital signal waveform "fd_activated" in FIG. 4 going from low to high corresponding to the arrow denoting a threshold amplitude at the receiver input corresponding to the first threshold amplitude at the PGA output) to protect receiver reliability. Meanwhile, the first (or activation) signal is sent to a backend digital decision feedback equalization circuit ("DFE"; similar to GC circuit 140, 240, or 340 of FIGS. 1-3, or the like). After a predefined time (e.g., between a few nanoseconds and a few milliseconds, or longer), the DFE GC circuit will send a second signal (also referred to as a "release signal"; in this case, "fd_release" or the like) to reset the fast detector to its initial position and to start monitoring the PGA output again (with the PGA reset to its initial or previous gain state; as depicted in the digital signal waveform "fd_release" in FIG. 4 going from low to high, followed soon after by the digital signal waveform "fd_activated" going from high to low, then followed later by the digital signal waveform "fd_release" going from high to low), until the next sudden receiver input jump.

Table 1 below shows comparative simulated reliability of the receiver.

TABLE 1

Simulated receiver reliability comparison.

| Simulated reliability | Lifetime |
|---|---|
| No FD, no clamp switch | <0.001 yrs |
| No FD, w/clamp switch | ~0.1 yrs |
| With FD, no clamp switch | >10 yrs |
| With FD, w/clamp switch | >10 yrs |

A baseline receiver—that is, a receiver with integrated PGA and ADC on the same semiconductor chip and with neither a fast detector nor a clamp switch (or other normally-off switch)—experiences poor reliability. As shown in Table 1 above, such a baseline receiver would have a lifetime of less than 0.001 years (or less than ~9 hours).

For a receiver with integrated PGA and ADC on the same semiconductor chip, and with a clamp switch or other normally-off switch disposed at, or added to, the differential output of the PGA, the maximum PGA output swing is clamped. Reliability of such a receiver is much improved (in this case, improved to about 0.1 years or about 36.5 days).

As shown in Table 1, for a receiver with integrated PGA and ADC on the same semiconductor chip, and with a fast detector integrated with the output of the PGA, the maximum PGA output swing is constrained. Reliability of such a receiver is further improved (in this case, improved to greater than 10 years). Similarly, for a receiver with integrated PGA and ADC on the same semiconductor chip, and with both a fast detector integrated with the output of the PGA and a clamp switch or other normally-off switch disposed at, or added to, the differential output of the PGA, the maximum PGA output swing is clamped. Reliability of such a receiver is likewise further improved over the no-fast-detector receivers described above (in this case, improved to greater than 10 years). In other words, a fully reliable receiver (with a 10+ year lifetime) is obtained once at least the fast detector is used or once both the fast detector and the clamp switch (or other normally-off switch) are used.

Figure 5A:
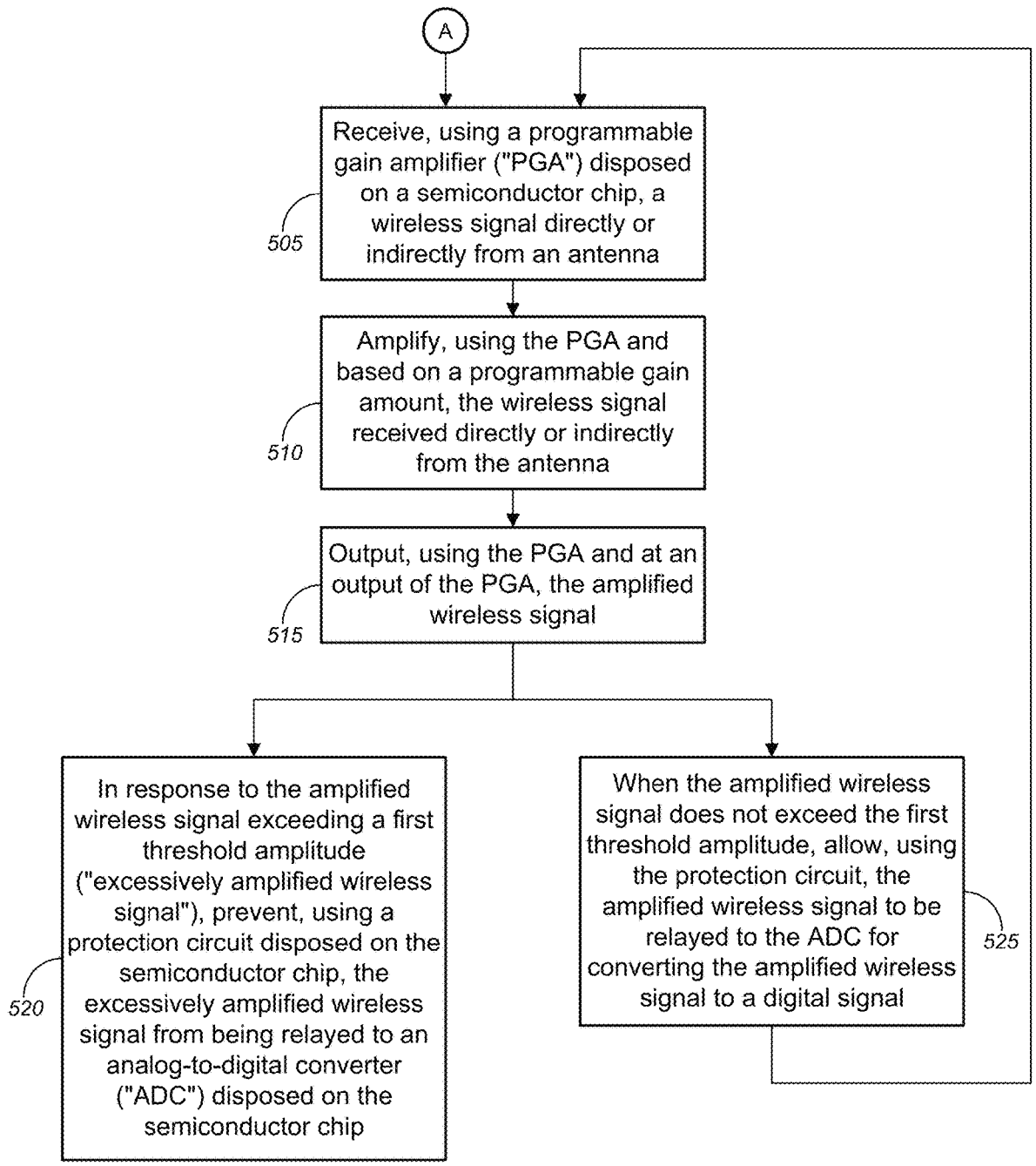
FIGS. 5A and 5B are flow diagrams illustrating a method for implementing a novel integrated PGA and protection circuit, in accordance with various embodiments.
Figure 5B:
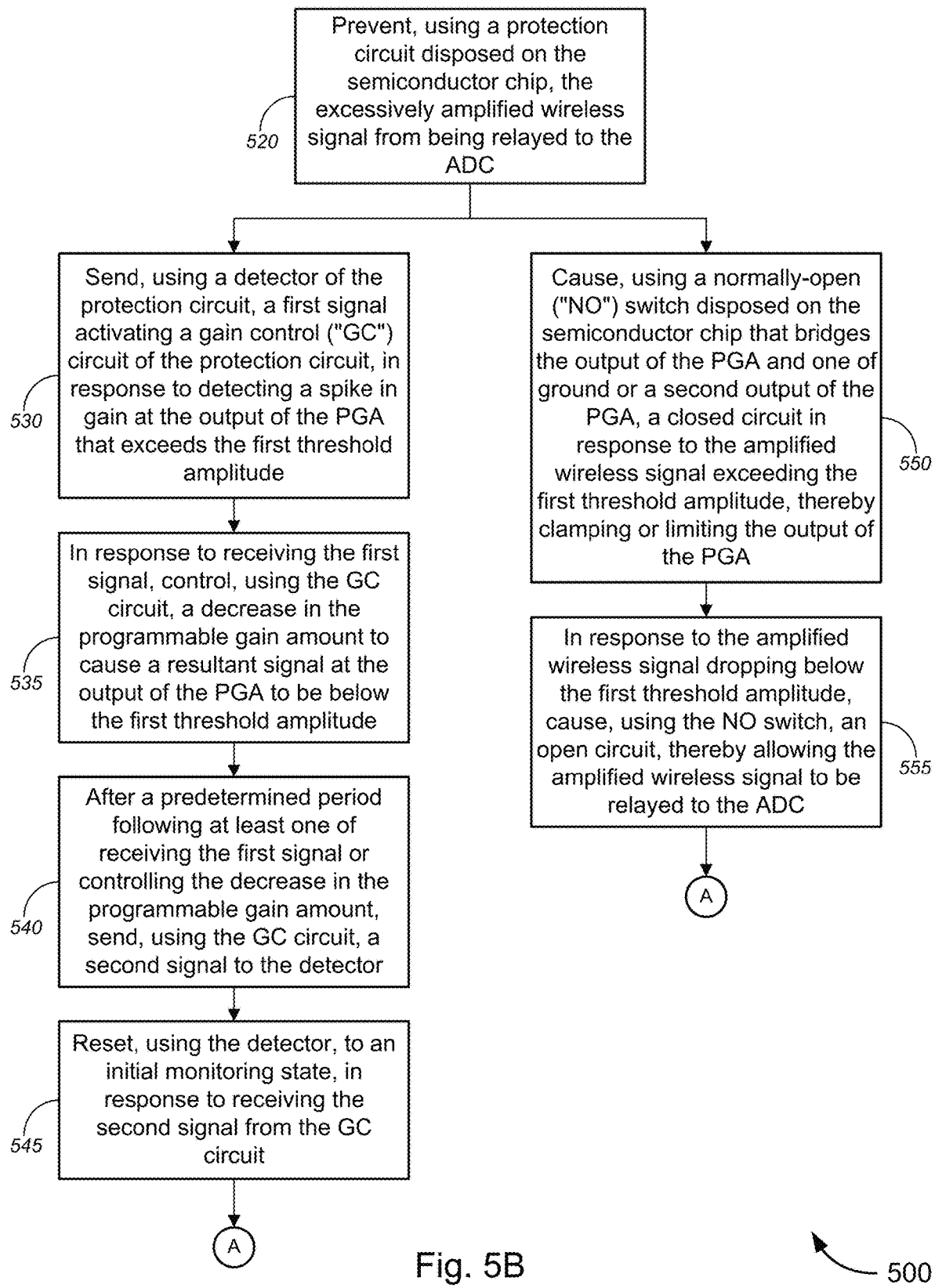

FIGS. 5A and 5B (collectively, "FIG. 5") are flow diagrams illustrating a method 500 for implementing a novel integrated PGA and protection circuit, in accordance with various embodiments. Method 500 of FIG. 5B returns to FIG. 5A following the circular marker denoted, "A."

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems, examples, or embodiments 100, 200, 300, and 400 of FIGS. 1, 2, 3, and 4, respectively (or components thereof), such methods may also be implemented using any suitable hardware (or software) implementation. Similarly, while each of the systems, examples, or embodiments 100, 200, 300, and 400 of FIGS. 1, 2, 3, and 4, respectively (or components thereof), can operate according to the method 500 illustrated by FIG. 5 (e.g., by executing instructions embodied on a computer readable medium), the systems, examples, or embodiments 100, 200, 300, and 400 of FIGS. 1, 2, 3, and 4 can each also operate according to other modes of operation and/or perform other suitable procedures.

In the non-limiting embodiment of FIG. 5A, method 500, at block 505, comprises receiving, using a programmable gain amplifier ("PGA") disposed on a semiconductor chip, a wireless signal directly or indirectly from an antenna. In some cases, the semiconductor chip comprises a complementary metal-oxide semiconductor ("CMOS") chip, or the like.

At block 510, method 500 comprises amplifying, using the PGA and based on a programmable gain amount, the wireless signal received directly or indirectly from the antenna. Method 500 further comprises outputting, using the PGA and at an output of the PGA, the amplified wireless signal (block 515).

Method 500 further comprises, at block 520, in response to the amplified wireless signal exceeding a first threshold amplitude ("excessively amplified wireless signal"), preventing, using a protection circuit disposed on the semiconductor chip, the excessively amplified wireless signal from being relayed to an analog-to-digital converter ("ADC") disposed on the semiconductor chip. In some cases, the first threshold amplitude (e.g., 100's of millivolts, or the like) comprises one of a predetermined threshold amplitude value or an adjustable threshold amplitude value.

However, method 500 further comprises, when the amplified wireless signal does not exceed the first threshold amplitude, allowing, using the protection circuit, the amplified wireless signal to be relayed to the ADC for converting the amplified wireless signal to a digital signal (block 525). Method 500 then returns to the process at block 505 to continue receiving wireless signal(s) from the antenna.

With reference to FIG. 5B, in some embodiments, the protection circuit comprises a detector and a gain control ("GC") circuit. In such cases, preventing the excessively amplified wireless signal from being relayed to the ADC (at block 520) comprises sending, using the detector, a first signal activating the GC circuit in response to detecting a spike in gain at the output of the PGA that exceeds the first threshold amplitude (block 530); and, in response to receiving the first signal, controlling, using the GC circuit, a decrease in the programmable gain amount to cause a resultant signal at the output of the PGA to be below the first threshold amplitude (block 535). According to some embodiments, method 500 further comprises: after a predetermined period following at least one of receiving the first signal or controlling the decrease in the programmable gain amount, sending, using the GC circuit, a second signal to the detector (block 540); and resetting, using the detector, to an initial monitoring state (e.g., a state of monitoring the output of the PGA that occurred prior to activation of the GC circuit, or the like), in response to receiving the second signal from the GC circuit (block 545).

Method 500 returns to the process at block 505 in FIG. 5A following the circular marker denoted, "A," to continue receiving wireless signal(s) from the antenna.

Alternatively, or additionally, the protection circuit comprises (or further comprises) a normally-open ("NO") switch disposed on the semiconductor chip that bridges the output of the PGA and one of ground (terminal or point) or a second output of the PGA. In some instances, preventing the excessively amplified wireless signal from being relayed to the ADC (at block 520) comprises causing, using the NO switch, a closed circuit in response to the amplified wireless signal exceeding the first threshold amplitude, thereby clamping or limiting the output of the PGA (block 550).

Method 500 further comprises, in response to the amplified wireless signal dropping below the first threshold amplitude, causing, using the NO switch, an open circuit, thereby allowing the amplified wireless signal to be relayed to the ADC.

Method 500 returns to the process at block 505 in FIG. 5A following the circular marker denoted, "A," to continue receiving wireless signal(s) from the antenna.

Although not shown in FIGS. 1-5, instead of the fast detector being connected to the output of the PGA, the fast detector can be connected to the output of the receiver or the input of the PGA, and the first threshold amplitude would correspond to that of the receiver. The other components, features, and functionalities would be similar, if not identical, to those described above with respect to FIGS. 1-5.

While particular features and aspects have been described with respect to some embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while particular functionality is ascribed to particular system components, unless the context dictates otherwise, this functionality need not be limited to such and can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—particular features for ease of description and to illustrate some aspects of those embodiments, the various components and/or features described herein with respect to a particular embodiment can be substituted, added, and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A circuit, comprising:
a programmable gain amplifier ("PGA") disposed on a semiconductor chip, the PGA configured to receive as input a wireless signal received directly or indirectly from an antenna and to output, at an output of the PGA, an amplified wireless signal based on the wireless signal being amplified by a programmable gain amount;
an analog-to-digital converter ("ADC") disposed on the semiconductor chip, the ADC configured to convert the amplified wireless signal that is received directly or indirectly from the PGA to a digital signal;
a protection circuit disposed on the semiconductor chip, the protection circuit configured to, in response to detecting a spike in gain at the output of the PGA that exceeds a first threshold amplitude, control a decrease in the programmable gain amount to cause a resultant signal at the output of the PGA to be below the first threshold amplitude; and
a normally-open ("NO") switch disposed on the semiconductor chip, the NO switch bridging the output of the PGA and one of ground or a second output of the PGA, the NO switch being configured to close circuit in response to the amplified wireless signal exceeding a second threshold amplitude, thereby clamping or limiting the output of the PGA.

2. The circuit of claim 1, wherein the protection circuit comprises a detector and a gain control ("GC") circuit, wherein the detector is configured to send a first signal activating the GC circuit in response to detecting a spike in gain at the output of the PGA that exceeds the first threshold amplitude, and to reset to a state of monitoring the output of the PGA that occurred prior to activation of the GC circuit in response to receiving a second signal from the GC circuit, wherein the GC circuit is configured to control the decrease in the programmable gain amount in response to receiving the first signal, and to send the second signal to the detector after a predetermined period following at least one of receiving the first signal or controlling the decrease in the programmable gain amount.

3. The circuit of claim 1, wherein controlling a decrease in the programmable gain amount comprises controlling the programmable gain amount to a minimum gain state.

4. The circuit of claim 1, wherein the NO switch comprises at least one of a clamp switch, a load switch, or a combination control logic and transistor switch.

5. The circuit of claim 1, wherein the second threshold amplitude is the same as the first threshold amplitude.

6. The circuit of claim 1, wherein the semiconductor chip comprises a complementary metal-oxide semiconductor ("CMOS") chip.

7. The circuit of claim 1, further comprising:
a filter that is disposed between the PGA and the ADC.

8. The circuit of claim 7, wherein the filter comprises at least one of a resistor-inductor-capacitor ("RLC") filter, a high-pass filter, a bandpass filter, or a low-pass filter.

9. An apparatus comprising:
an antenna;
a circuit, comprising:
a complementary metal-oxide semiconductor ("CMOS") chip;
a programmable gain amplifier ("PGA") disposed on the CMOS chip, the PGA configured to amplify, based on a programmable gain amount, a wireless signal received directly or indirectly from the antenna and to output, at an output of the PGA, the amplified wireless signal;
an analog-to-digital converter ("ADC") disposed on the CMOS chip, the ADC configured to convert the amplified wireless signal that is received directly or indirectly from the PGA to a digital signal; and
a protection circuit disposed on the CMOS chip in an integrated manner with at least one of the PGA and the ADC, the protection circuit configured to prevent amplified wireless signals that exceed a first threshold amplitude from being input at the ADC, the protection circuit comprising a normally-open ("NO") switch bridging the output of the PGA and one of ground or a second output of the PGA, the NO switch being configured to close circuit in response to the amplified wireless signal exceeding a second threshold amplitude, thereby clamping or limiting the output of the PGA.

10. The apparatus of claim 9, wherein the protection circuit comprises a detector and a gain control ("GC") circuit, wherein the detector is configured to send a first signal activating the GC circuit in response to detecting a spike in gain at the output of the PGA that exceeds the first threshold amplitude, and to reset to a state of monitoring the output of the PGA that occurred prior to activation of the GC circuit in response to receiving a second signal from the GC circuit, wherein the GC circuit is configured to control a decrease in the programmable gain amount to cause a resultant signal at the output of the PGA to be below the first threshold amplitude, in response to receiving the first signal, and to send the second signal to the detector after a predetermined period following at least one of receiving the first signal or controlling the decrease in the programmable gain amount.

11. The apparatus of claim 10, wherein controlling a decrease in the programmable gain amount comprises controlling the programmable gain amount to a minimum gain state.

12. The apparatus of claim 9, wherein the NO switch comprises at least one of a clamp switch, a load switch, or a combination control logic and transistor switch.

13. The apparatus of claim 9, wherein the circuit further comprises:
a filter that is disposed between the PGA and the ADC, wherein the filter comprises at least one of a resistor-inductor-capacitor ("RLC") filter, a high-pass filter, a bandpass filter, or a low-pass filter.

14. A method, comprising:
amplifying, using a programmable gain amplifier ("PGA") disposed on a semiconductor chip and based on a programmable gain amount, a wireless signal received directly or indirectly from an antenna;
outputting, using the PGA and at an output of the PGA, the amplified wireless signal;
in response to the amplified wireless signal exceeding a first threshold amplitude, preventing, using a protection circuit disposed on the semiconductor chip, the excessively amplified wireless signal from being relayed to an analog-to-digital converter ("ADC") disposed on the semiconductor chip, the protection circuit comprising a normally-open ("NO") switch bridging the output of the PGA and one of ground or a second output of the PGA, the NO switch being configured to close circuit in response to the amplified wireless signal exceeding a second threshold amplitude, thereby clamping or limiting the output of the PGA; and
allowing, using the protection circuit, the amplified wireless signal to be relayed to the ADC for converting the amplified wireless signal to a digital signal, when the amplified wireless signal does not exceed the first threshold amplitude.

15. The method of claim 14, wherein the protection circuit comprises a detector and a gain control ("GC") circuit, wherein:
preventing the excessively amplified wireless signal from being relayed to the ADC comprises sending, using the detector, a first signal activating the GC circuit in response to detecting a spike in gain at the output of the PGA that exceeds the first threshold amplitude; and, in response to receiving the first signal, controlling, using the GC circuit, a decrease in the programmable gain amount to cause a resultant signal at the output of the PGA to be below the first threshold amplitude;
the method further comprises:
after a predetermined period following at least one of receiving the first signal or controlling the decrease in the programmable gain amount, sending, using the GC circuit, a second signal to the detector; and
resetting, using the detector, to a state of monitoring the output of the PGA that occurred prior to activation of the GC circuit, in response to receiving the second signal from the GC circuit.

16. The method of claim 14, wherein the NO switch is disposed on the semiconductor chip that bridges the output of the PGA and one of ground or a second output of the PGA, wherein preventing the excessively amplified wireless signal from being relayed to the ADC comprises causing, using the NO switch, a closed circuit in response to the amplified wireless signal exceeding the first threshold amplitude, thereby clamping or limiting the output of the PGA.

* * * * *